Patented May 2, 1933

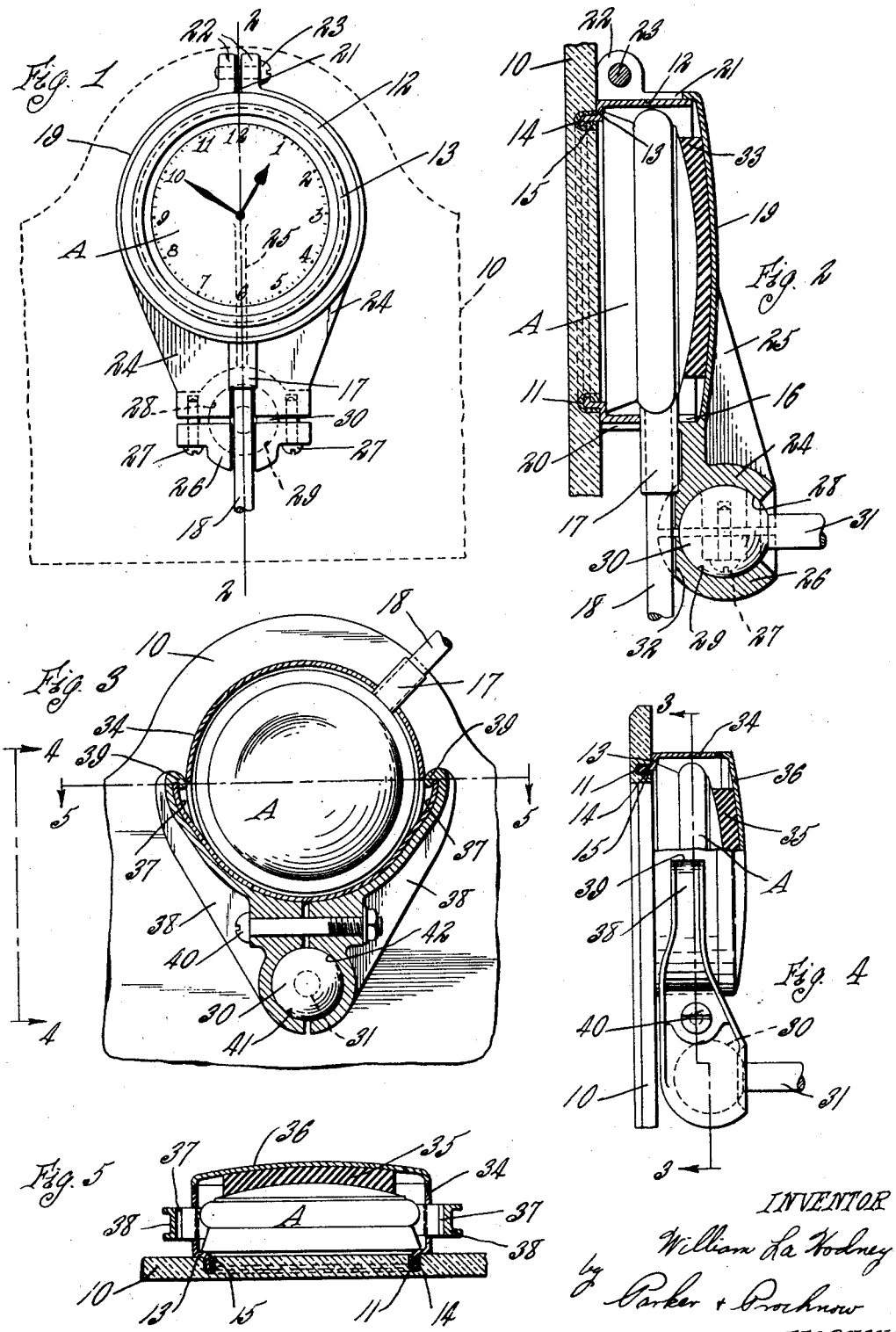

1,906,630

UNITED STATES PATENT OFFICE

WILLIAM LA HODNEY, OF BUFFALO, NEW YORK

COMBINED MIRROR AND TIMEPIECE

Application filed April 25, 1931. Serial No. 532,842.

This invention relates to mounting means, and particularly to means for mounting an instrument upon a panel such as a rear view mirror, and used in connection with motor vehicles.

An object of this invention is to improve the appearance and construction of mounting means of this type.

Another object of the invention is to provide improved means for attaching an instrument to a panel and supporting the panel, with which the mounting and supporting means will be entirely concealed by the panel, with which the instrument will be easily accessible and replaceable, and which will be exceptionally simple, compact, durable, vibrationless and inexpensive.

Various other objects and advantages will be apparent from the following description of several embodiments of the invention, and the novel features will be particularly pointed out hereinafter in connection with the appended claims.

In the accompanying drawings:

Fig. 1 is front elevation of means for mounting a time piece on a mirror, and of the support for both the time piece and the mirror plate, which plate is shown in dash lines;

Fig. 2 is a transverse, sectional elevation approximately through the center of the same;

Fig. 3 is a sectional elevation through another embodiment of the invention, the section being taken approximately along the line 3—3 of Fig. 4;

Fig. 4 is a side elevation of the same when viewed from approximately the line 4—4 of Fig. 3, with certain parts broken away;

Fig. 5 is a sectional plan of the same, the section being taken approximately along the line 5—5 of Fig. 3;

Figures 6, 7:
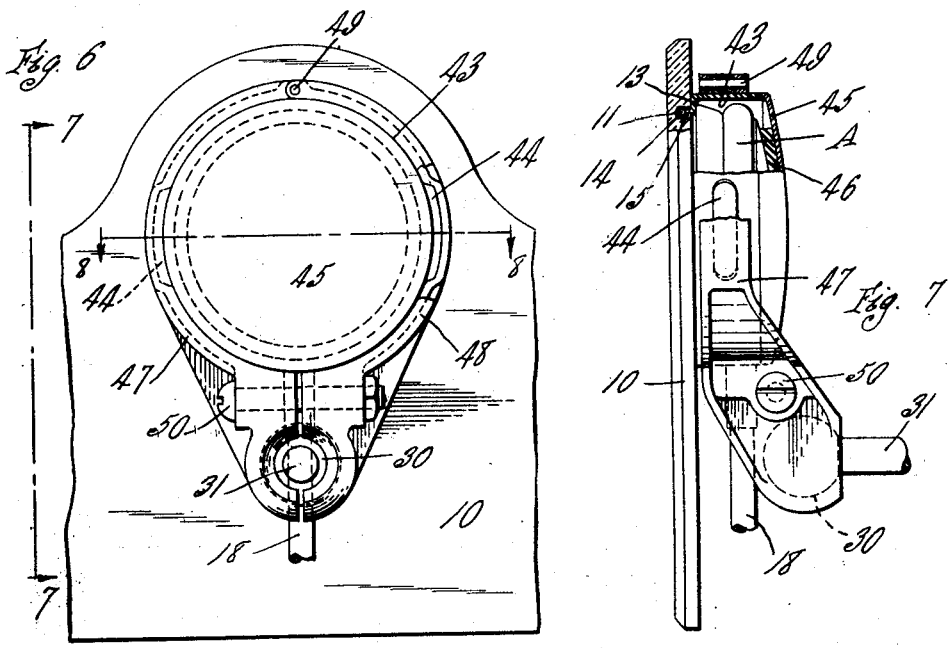
Fig. 6 is a rear elevation of still another embodiment of the invention.
Fig. 7 is a side elevation of the same, when viewed approximately from the line 7—7 of Fig. 6, certain of the parts being broken away to illustrate certain details.

In the embodiment of the invention illustrated in Figs. 1 and 2, the improved device includes a panel or plate 10 of transparent material, such as glass, having the usual reflective coating upon the rear face thereof. The plate 10 is also provided with an annular groove 11 in its rear face, the groove preferably having a maximum depth less than the thickness of the plate. A tubular, open ended shell 12 of suitable material, such as sheet metal, is disposed endwise against the rear face of plate 10, and at the end abutting the plate 10, the shell is reduced in diameter slightly to provide a shoulder section 13 leading to the contracted end or section 14. The shoulder section abuts the rear face of the plate 10 and the section 14 extends into the groove 11.

The section 14 may be flanged inwardly or undercut at its free end so as to form an anchorage abutment, as will be explained presently. The groove 11 is filled with cement 15, which adheres to the glass, and through the flange or abutment in section 14, the shell 12 will be securely anchored in the annular groove. The area of the rear face of the plate 10 which is encompassed by the annular groove 11 is largely free of a reflective coating, so that that section of the plate will function as a transparent window or crystal through which will be visible the dial and hands of a time piece A, that is removably mounted in the shell 12.

The time piece A is formed separately from the shell 12, and the shell 12 is provided with a slot 16 extending in an endwise direction from its outer end, through which the bearing sleeve 17 of the stem 18 of the time piece may extend when the time piece is inserted into the shell 12 from the open, rear end thereof. A second shell or cup-like member 19 telescopes over the shell 12 from the rear end thereof, so as to form with the shell 12 a complete enclosure for the time piece. The shell 19 is provided in its side wall with a slot 20 which straddles the sleeve 17 when the shell 19 is fitted over the shell 12, and also may be provided with another slot 21 extending in a direction endwise thereof from its open face, along the opposite sides of which are ears or lugs 22. A bolt or screw 23 passes between the ears and serves to draw them together, and contract the encircling shell 19 upon the shell 12 so as to frictionally clamp the shell 19 to the shell 12.

The shell 19 is provided with a lateral extension 24 which may be suitably reenforced by a web 25. This lateral extension is formed of two sections, one of which sections is in the nature of a cap piece 26 that is clamped removably to the other section by screws 27. The abutting faces of the two sections of the member 24 are provided with concave, partially spherical seats 28 and 29 which frictionally engage and are clamped to the spherical head 30 of a stud 31 that is anchored to a suitable part of the vehicle upon which the mirror and time piece are to be mounted. By tightening the screws 27 any desired degree of friction on the head 30 may be obtained. The space through which the shank of the stud extends is somewhat larger than the shank so that the stud 31 may have a limited universal or angular movement with respect to the extension 24 of the shell 19.

The forward faces of the extension 24 and its removable section 26 may be provided with a slot 32 receiving the depending stem 18 of the time piece, so as to guide the stem during the winding and hand-setting manipulations thereof. The time piece A may be confined against play within the enclosure formed by the shells 12 and 19 in any suitable manner, such as by inserting a pad 33 of cushioning material, for example, felt or soft or sponge rubber, between the rear end of the shell 19 and rear face of the time piece.

In the embodiment of the invention illustrated in Figs. 3 to 5, a shell 34 is similar in size and shape to the shell 12 of Figs. 1 and 2 and is attached to the plate 10 in the same manner as explained for Figs. 1 and 2. A time piece A is confined within the shell 34 by any suitable means, such as a cushion pad 35, similar to the pad 33 of Figs. 1 and 2, which is inserted between the rear face of the time piece A and a removable cover plate 36 that is removably attached to the rear or open end of the shell 34. A snap or screw connection between the shell 34 and the cover 36 is convenient for this purpose. The shell 34 at opposite sides is provided with drawn or struck out tongues 37, both opening upwardly. A pair of arms 38 extend in opposite directions peripherally of the shell 34 from the lower part thereof, and terminate in hooked ends 39 which engage in open apertures formed at the ends of the struck out or drawn tongues 37, that is, the hook ends 39 engage over the free end edges of the struck out or drawn ears 37.

The adjacent ends of the arms 38 are drawn toward one another by a bolt 40, and tightening of the bolt 40 securely clamps the arms to the shell 34. The arms 38 extend laterally away from the shell 34 after their connection with the bolt 40 and the abutting faces of these lateral extensions are provided with concave, partially spherical seats or cavities 41 and 42 which receive and frictionally clamp the spherical head 30 of the stud 31. The head 30 is thus part of universal bolt connection between the supporting stud 31 and the arms 38, so that the latter and the casing 34 to which they are clamped may be adjusted angularly to a limited extent upon the stud 31. The arms 38 thus correspond to the parts 24 and 26 of Figs. 1 and 2.

Figure 8:
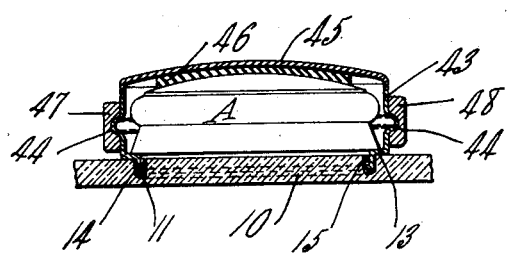
Fig. 8 is a sectional plan of the same, the section being taken approximately along the line 8—8 of Fig. 6.

In the embodiment of the invention illustrated in Figs. 6 to 8, the open ended tubular shell 43 is similar to the shell 34, except that in place of the struck out or drawn tongues 37 the shell is provided with a pair of corrugated or drawn ribs 44 which are spaced apart and extend in a direction peripherally of the shell, as shown in Figs. 7 and 8, particularly. The shell 43 is anchored in the plate 10 in the same manner as in Figs. 1 to 5, and may be provided with a removable snap cover 45 at its rear end. A resilient cushion 46 may be interposed between the cover 45 and a time piece A which is disposed within the shell 43.

A pair of arms 47 and 48, which correspond broadly to the arms 38 of Figs. 3 to 5, extend around or straddle the peripheral part of the shell 43 and are jointed at their upper ends by a hinge connection 49. In this respect the arms 47 and 48 are quite similar to the shell 19 in that they substantially encircle or straddle the shell 43, and are clamped thereto by the tightening of a bolt 50 which passes between the free ends of the arms that lie adjacent one another, and then extend laterally away from the shell 43.

The arms 47 and 48 may be provided with recesses on their inner faces to interfit with the ribs 44, and be held thereby against movement in a direction endwise of the shell 43. The ribs 44 also prevent any material angular rotation of the arms as a unit about the central axis of the shell 43. The arms 47 and 48 are frictionally clamped to the spherical head 30 of the opposing stud 31, the same as in Figs. 3 to 5. The arms 47 and 48 at their abutting ends may have cooperating grooves to form a slot which receives and guides the stem 18 of the time piece A.

It will be observed that in all the embodiments of the invention, the tubular shell which is cemented in the annular groove of or otherwise attached to the transparent plate is supported by an element which partially or entirely encircles the shell and is clamped thereto, and this element is formed of two sections which are clamped upon a spherical head to provide a universal joint or connection to the supporting stud 31. The plate, panel or mirror 10 is supported entirely from the open ended tubular shell which is cemented or attached thereto, and the shell in turn is removably mounted in a clamping device that has a universal mounting on the stud 31. The entire supporting means for the mirror and time piece is fully concealed behind the mirror, with the result that the periphery and front face of the mirror are unmarred by unsightly clamping means which heretofore have been in use.

It will be obvious that various changes in the details, which have been herein described and illustrated in order to explain the nature of the invention, may be made by those skilled in the art within the principle and scope of the invention as expressed in the appended claims.

I claim as my invention:

1. Mounting means, comprising a plate, an open ended tubular shell abutting endwise against one face of said plate and attached thereto, a second shell fitting over the first shell and forming therewith a cavity in which an instrument may be mounted, means for releasably securing said shells together, said second shell being formed of two separable sections having opposed, partially spherical seats between them, a supporting stud terminating in a spherical head disposed between said seats, and means for drawing said sections together to clamp said second shell frictionally to said spherical head and provide a universal, frictional connection between said second shell and said stud.

2. Mounting means, comprising a plate, an open ended tubular shell abutting endwise against the rear face of said plate and attached thereto, a supporting member extending in a direction around the shell and releasably engageable therewith to form a support therefor, said member being formed of two sections having partially spherical, concave seats in their abutting faces, a supporting stud terminating in a spherical head received between said supporting seats, and means for drawing said sections toward one another so as to frictionally clamp said sections to said stud, and serve as a universal, frictional joint connection thereto.

3. Mounting means, comprising a plate, an open ended tubular shell abutting endwise against and secured to the rear face of said plate, arms straddling said shell in a peripheral direction and also at their adjacent ends extending laterally from one side thereof, said arms in the lateral extensions having concave, partially spherical seats in abutting faces, a stud having a spherical head received between said seats, and means for drawing together adjacent ends of said arms at the lateral extension, to clamp said arms frictionally to said head and provide a universal connection thereto.

4. Mounting means, comprising a plate having a tubular open ended shell extending endwise from and attached solely to the interior area of a face of said plate, means clampingly engageable with and supporting said shell and having two sections adjustable toward and from one another, the abutting faces of said sections having cavities therein, and a stud terminating in a head received in said cavities, and clamped therein by the adjustment of said sections toward one another.

5. Mounting means, comprising a member having a groove in its rear face, an open ended tubular shell abutting endwise against the rear face of said member and anchored in said groove, means encircling and removably engageable with and fully supporting said shell and having a pair of sections adjustable toward and from one another, said sections on adjacent faces having opposed cavities, a stud having a head received in said cavities, and means for drawing said sections together to clamp them to said head.

6. Mounting means, comprising an element having a tubular open ended shell extending endwise as a boss from a face thereof, a strap member surrounding said shell and having two free ends adjustable toward and from one another to clamp said member to said shell, said ends having laterally extending portions with opposed concave seats in the abutting faces, a stud having a head received between said seats, and means for drawing the free ends of said member together to clamp it to said casing and also cause them to frictionally grip said head.

7. Mounting means comprising a member having an open ended tubular shell extending from a face thereof, means straddling said shell and formed of two sections which when drawn together secure said means to said shell, said sections having opposed cavities in abutting faces, a stud having a head received in said cavities and frictionally gripped therein when said sections are drawn together to clamp them to said shell, means for drawing said sections together to different extents, and a time piece confined within said shell and visible through said plate.

8. Means for adjustably supporting an instrument comprising an open ended tubular shell which forms a housing for the instrument, means straddling said shell and formed of two sections which when drawn together secure said member to said shell, said sections having opposed cavities in abutting faces, a stud having a head received in said cavities and frictionally gripped therein when said sections are drawn together to clamp them to said shell, means for drawing said sections together to different extents, said shell and straddling means having cooperating parts which prevent movement of said straddling means in a direction endwise of the shell.

9. Means for adjustably supporting an instrument comprising an open ended tubular shell which forms a housing for the instrument, said shell having drawn out portions in the peripheral wall thereof and spaced apart in a peripheral direction, arms engageable with said drawn out portions and extending along the periphery of said shell into proximity to one another and then extending laterally of the shell to provide clamping arms, adjustable means for drawing said clamping arms toward one another, said clamping arms having concave seats in abutting faces and a stud having a head clamped between and in said seats when said arms are drawn toward one another.

WILLIAM LA HODNEY.